United States Patent
Lai

(10) Patent No.: US 8,169,565 B2
(45) Date of Patent: May 1, 2012

(54) MOUNTING MECHANISM FOR FIXING COMPUTER MAINFRAME

(75) Inventor: Chih-Huei Lai, Sijhih (TW)

(73) Assignee: MSI Computer (Shenzhen) Co., Ltd., Shenzhen (CN)

( * ) Notice: Subject to any disclaimer, the term of this patent is extended or adjusted under 35 U.S.C. 154(b) by 525 days.

(21) Appl. No.: 12/510,609

(22) Filed: Jul. 28, 2009

(65) Prior Publication Data

US 2010/0141864 A1 Jun. 10, 2010

(30) Foreign Application Priority Data

Dec. 5, 2008 (TW) ............................. 97221826 U

(51) Int. Cl.
*G02F 1/1333* (2006.01)
*H05K 5/00* (2006.01)
*A47J 47/16* (2006.01)

(52) U.S. Cl. ........ 349/60; 349/58; 361/679.01; 248/132

(58) Field of Classification Search .............. 349/58–60; 361/679.01–679.02; 248/132
See application file for complete search history.

(56) References Cited

U.S. PATENT DOCUMENTS

| | | | |
|---|---|---|---|
| 6,618,241 B2* | 9/2003 | Bang | 361/679.6 |
| 2004/0100758 A1* | 5/2004 | Chen et al. | 361/681 |

* cited by examiner

*Primary Examiner* — Dung T. Nguyen

(57) ABSTRACT

A mounting mechanism for fixing a computer mainframe includes a retaining base and an article; the retaining base includes a first plate, a second plate and an extensible screw; the retaining base is coupled to the article; the first plate is disposed with at least one hanging tab; the lower end of the first plate is coupled to the second plate, and the hanging tab is positioned above the second plate in order to couple to a computer mainframe with a different width conveniently; the hanging tab may be extended in a hanging hole of the computer mainframe corresponding thereto; a bolt of the extensible screw may be extended out of a hole of the second plate to engage with a screw hole of the computer mainframe corresponding thereto thereby allowing the computer mainframe to be coupled to or detached from the mounting mechanism easily without using tools.

18 Claims, 9 Drawing Sheets

MOUNTING MECHANISM FOR FIXING COMPUTER MAINFRAME

CROSS REFERENCE TO RELATED DOCUMENT

This application claims priority to TAIWAN Patent Application No. 097221826, filed on Dec. 5, 2008.

BACKGROUND OF THE INVENTION

1. Field of the Invention

The present invention relates to a mounting mechanism for fixing an article, and more particularly to a mounting mechanism for fixing a personal computer mainframe.

2. Description of Related Art

A mounting mechanism structure for fixing a mainframe disclosed by a several patents concerning a mounting mechanism for fixing a personal computer mainframe such as Taiwan Patent No. M315003 is a frame bended to form an accepting space; a mainframe is placed in the accepting space; the middle of one side of the frame is disposed with a projecting portion and a hole is disposed on the projecting portion; the hole is used to hang and position the mainframe.

Because a computer mainframe becomes shorter, smaller, lighter and thinner, it is practicable to couple a mini-computer mainframe to the back of a liquid crystal display (LCD). For example, Taiwan Patent No. 526936 discloses an integration back frame set for a mini-computer and a LCD, including a back frame and a tape fastener; the back frame set is formed by coupling a back plate to a bottom plate perpendicular thereto; a plurality of retaining slots are disposed on proper positions of the upper rim of the back plate so as to accept the tape fastener and allow it to be passed through; a plurality of through holes corresponding to screw holes on the rear side of the LCD are opened below the upper rim of the back plate, allowing screws to lock the back plate to the rear end face of the LCD; the computer mainframe can be retained on the back plate through the tape fastener when the computer mainframe is placed on the back frame. But, using the tape fastener to bind the computer mainframe needs to bind the tape fastener up tightly and then fasten it; the operation is not inconvenient and the computer mainframe cannot be retained on the back frame stably. The computer mainframe may drop to the lower side of the back frame from the two sides of the back frame

SUMMARY OF THE INVENTION

To improve the deficit mentioned above, the present invention is proposed.

The main object of the present invention is to provide a mounting mechanism for fixing a computer mainframe, the structure thereof is simple and it is convenient for another article such as a LCD to be coupled to the computer mainframe.

Another object of the present invention is to provide a mounting mechanism for fixing a computer mainframe, convenient for coupling the computer mainframe thereto stably and detaching the computer mainframe therefrom.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
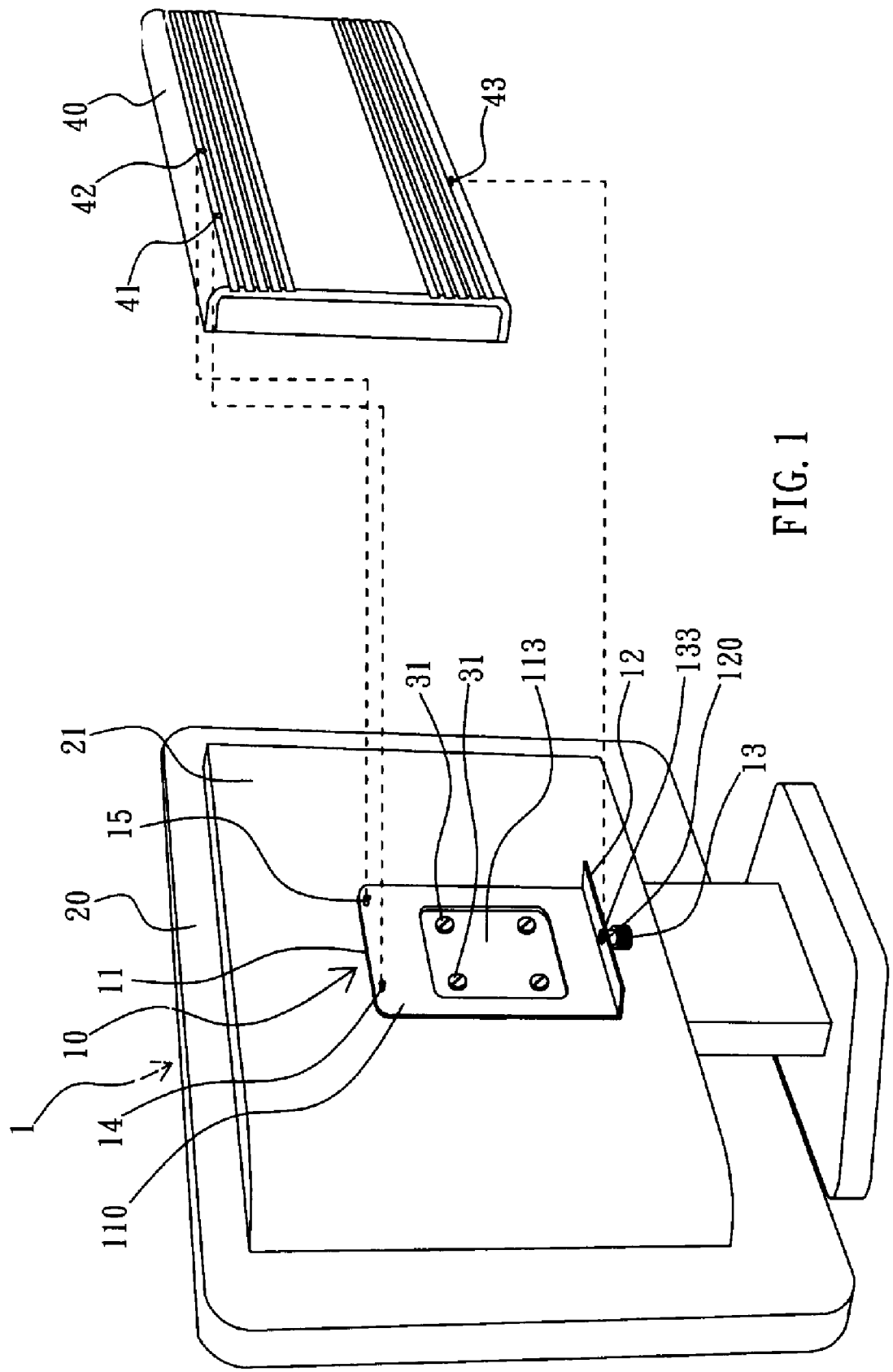
FIG. 1 is a schematic view, showing a mounting mechanism of a first preferred embodiment according to the present invention while being not coupled to a computer mainframe.

As shown in FIG. 1. A mounting mechanism 1 for fixing a computer mainframe of a first preferred embodiment according to the present invention includes a retaining base 10 and an article 20. The retaining base 10 includes a first plate 11, a second plate 12 and an extensible screw 13. The retaining base 10 is coupled to the article 20 through a plurality of screws 31. The retaining base 10 is used to couple detachably to a computer mainframe 40, ensuring that the computer mainframe 40 is coupled detachably to the article 20. The computer mainframe 40 may be a personal computer mainframe and more particularly is a mini-personal computer mainframe. The article 20 may be a LCD or other kind of display.

Figure 2:
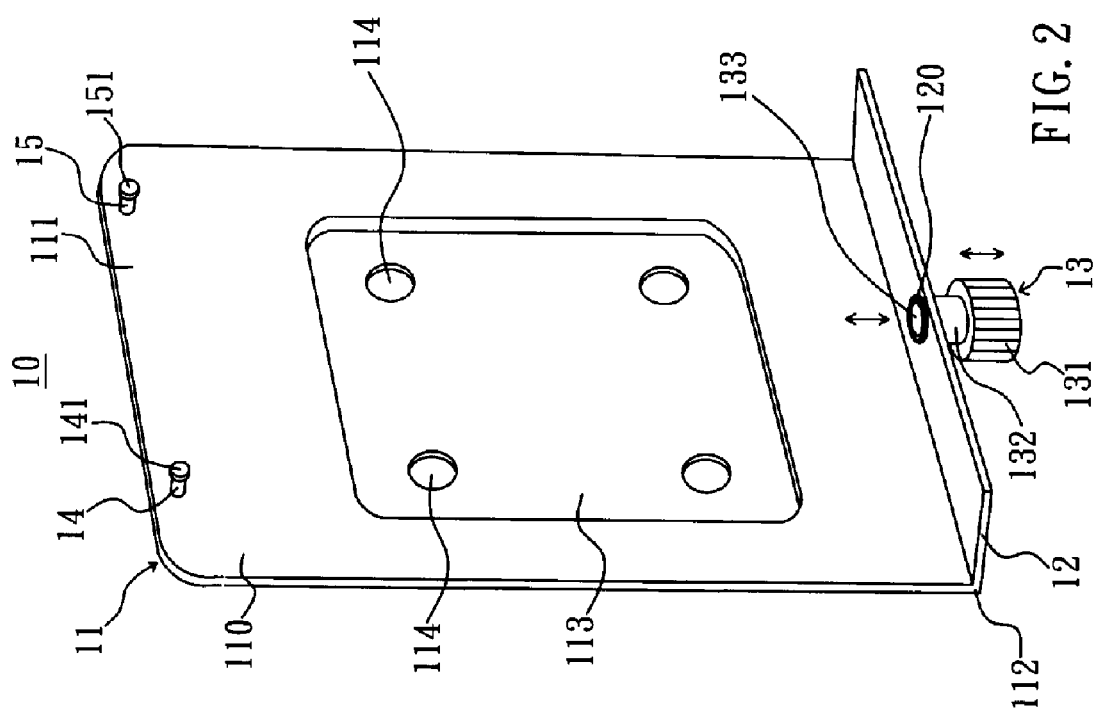
FIG. 2 is a perspective view, showing a retaining base according to the present invention.

As shown in FIG. 2. The first plate 11 of the retaining base 10 has an abutment face 110, a first end 111, a second end 112, an indented face 113 and a plurality of holes 114. The indented face 113 is positioned between the first end 111 and the second end 112. The indented face 113 is indented toward the rear of the abutment face 110. The plurality of holes 114 are disposed on the indented face 113. Two hanging tabs arranged 14 and 15 at the same horizontally plane are disposed on positions close to the first end 111 of the first plate 11; the two hanging tabs 14 and 15 are projected out of the abutment face 110. The two hanging tabs 14 and 15 respectively have blocking portions 141 and 151. The two hanging tabs 14 and 15 are riveted on the first plate 11, or the shapes of the two hanging tabs 14 and 15 may first be stamped on the first plate 11 and the two hanging tabs 14 and 15 are respectively bended to cause the blocking portions 141 and 151 to be projected out of the abutment face 110.

The second plate 12 is coupled to the second end 112 of the first plate 11 and is perpendicular to the first plate 11. The second plate 12 is projected out of the abutment face 110. The second plate 12 may also be integrated with the first plate 11. A hole 120 is disposed on the middle position of the second plate 12.

Figure 3:
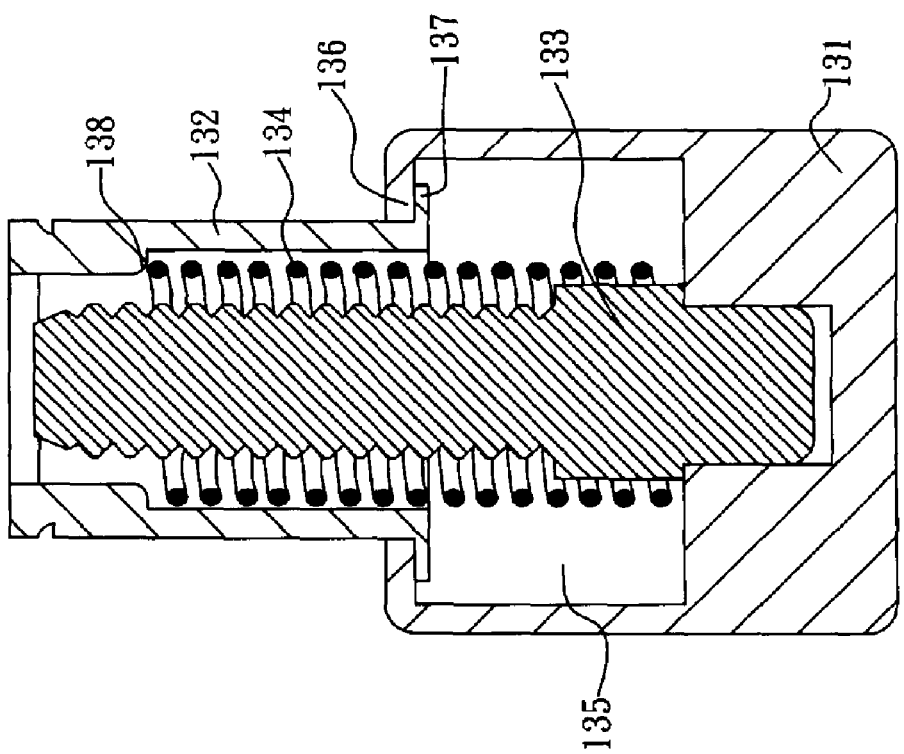
FIG. 3 is a cross sectional view, showing an extensible screw.

As shown in FIG. 3. The extensible screw 13 includes a movable portion 131, a fixed portion 132, a bolt 133 and a coiled spring 134. The fixed portion 132 is a tube-shaped object, and the movable portion 131 is disposed with an inner space 135. The inner space 135 of the movable portion 131 is engaged movably with the fixed portion 132. A first interference element 136 and a second interference element 137 corresponding to each other are respectively disposed on the inside of the upper end of the movable portion 131 and the outside of the lower end of the fixed portion 132. The vertical movement of the first interference element 136 along the outer periphery of the fixed portion 132 is limited by the second interference element 137, ensuring that the movable portion 131 will not be released downward from the fixed portion 132.

The coiled spring 134 is engaged with the bolt 133. The coil spring 134 and the bolt 133 are placed in the inner portion of the fixed portion 132 and the inner space 135 of the movable portion 131. The lower end of the bolt 133 is fixed to the movable 131. The inside of the upper end of the fixed portion 132 is disposed with a third interference element 138 used for restricting the coiled spring 134 to extend out of the fixed portion 132.

As shown in FIG. 2. The upper end of the fixed portion 132 of the extensible screw 13 is coupled to the second plate 12, allowing the bolt 133 to be couple movably to the second plate 12; the hole 120 is used for accepting the bolt 133. The bolt 133 is caused to extend out of the hole 120 to the upper side of the second plate 12 by using the movable portion 133 to drive the bolt 133 to move vertically and rotate, in this case the extensible screw 13 may be replaced with a general screw.

Figure 4:
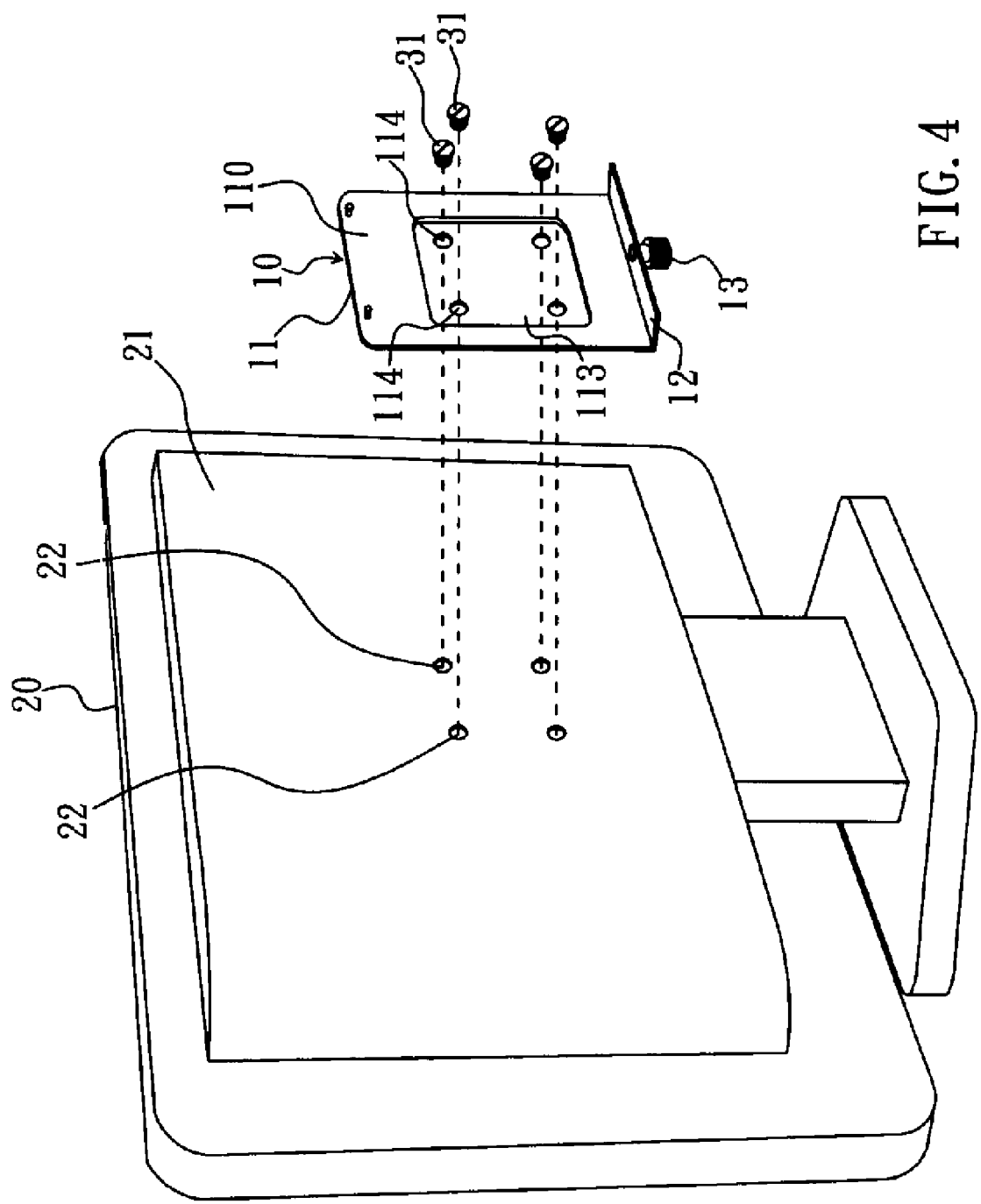
FIG. 4 is an exploded view, showing a mounting mechanism for fixing a computer mainframe of the first embodiment according to the present invention.

As shown in FIG. 4. The plurality of holes 114 of the first plate 11 corresponds to a plurality of screw holes 22 of a rear face 21 of the article 20. A plurality of screws 31 are respectively passed through the plurality of holes 114 to engage with the plurality of screw holes 22, allowing the first plate 111 to be coupled to the rear face 21 of the article 20 fixedly. Using the design of the indented face 113 allows the plurality of screws 31 not to project out of the abutment face 110 to influence the leaning of the computer mainframe 40 against the abutment face 110.

Figure 5:
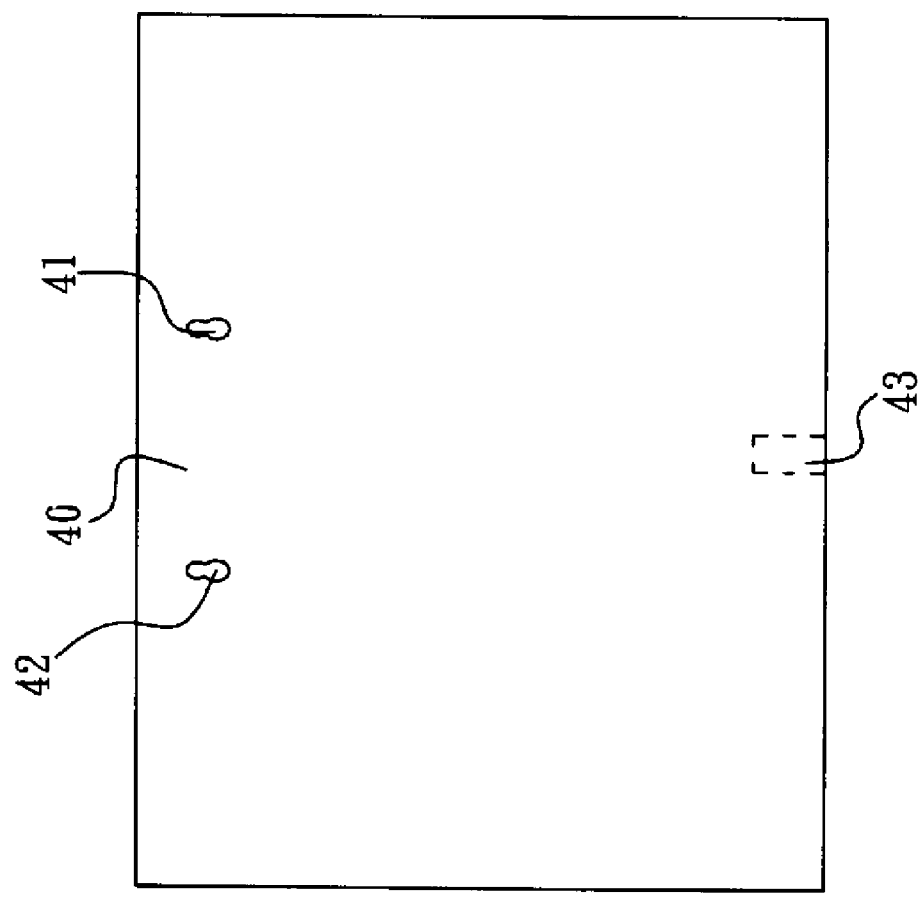
FIG. 5 is a rear view of a computer mainframe.
Figure 6:
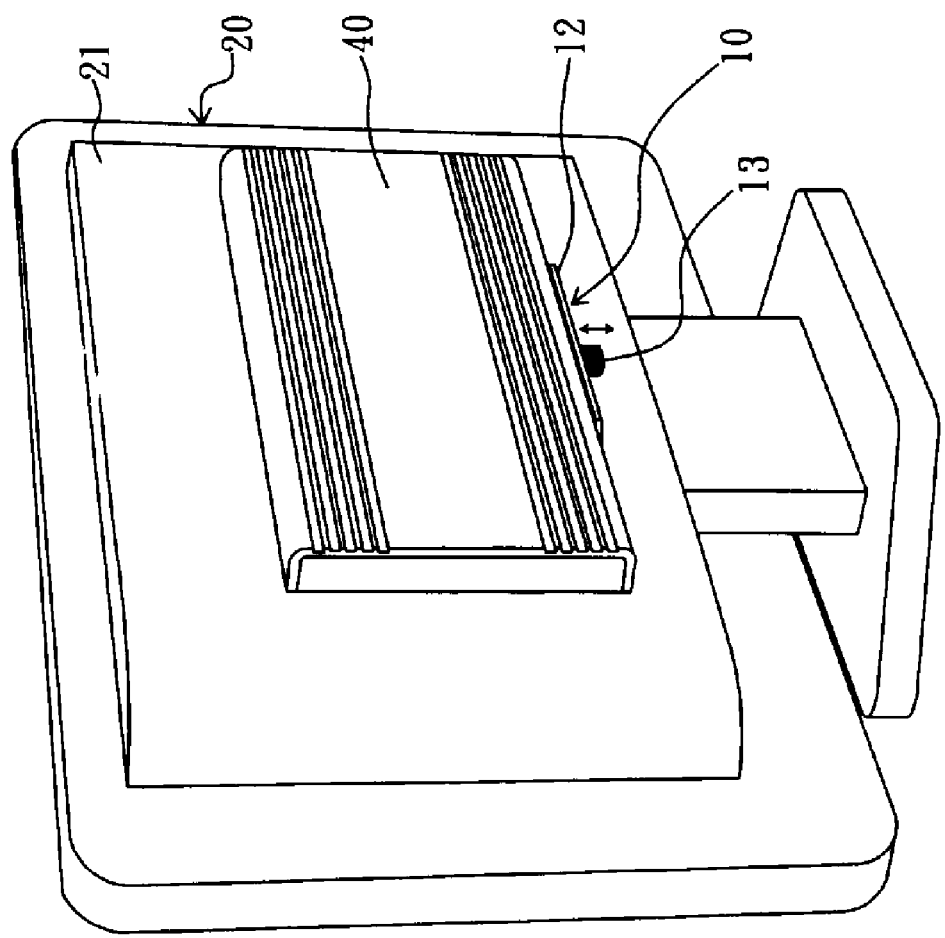
FIG. 6 is a perspective view, showing a mounting mechanism of the first embodiment according to the present invention coupled to a computer mainframe.

As shown in FIGS. 1, 2 and 5. The two hanging tabs 14 and 15 of the first plate 11 respectively correspond to two hanging holes 41 and 42 of the computer mainframe 40; the hole 120 of the second plate 12 corresponds to a screw hole 43 of the computer mainframe 40. The diameters of the lower ends of the two hanging holes 14 and 15 respectively are larger than the diameters of the upper ends thereof as FIG. 5 shows. The blocking portions 141 and 151 of the two hanging tabs 14 and 15 respectively are smaller than the diameters of the lower ends of the two hanging holes 41 and 42 but larger than the diameters of the upper ends thereof such that the computer mainframe 40 is moved downward to cause the two blocking portions 141 and 151 to be respectively positioned in the upper ends of the two hanging holes 41 and 42 thereby not escaping from them after the two blocking portions 141 and 151 of the two hanging tabs 14 and 15 are extended into the two hanging holes 41 and 42 via the lower ends of the two hanging holes 41 and 42. Next, the computer mainframe 40 is allowed to lean against the abutment face 110, the lower end thereof is placed on the upper side of the second plate 12, and the bolt 133 of the extensible screw 13 is then engaged with the screw hole 43 of the computer mainframe 40 thereby coupling the computer mainframe 40 to the retaining base 10 stably and fixing it on the rear face of the article 20 as FIG. 6 shows. The two hanging tabs 14 and 15 can support the computer mainframe stably and the computer mainframe 40 is not to sway about through the two-points supporting. The bolt 133 is allowed to release from the screw hole 43 of the computer mainframe 40 while rotating the bolt 133 of the extensible screw 13, the computer mainframe 40 is then moved upward to cause the blocking portions 141 and 151 of the two hanging tabs 14 and 15 to be released from the two hanging holes 41 and 42, and the computer mainframe 40 can then released from the retaining base 10 and separated from the article 20.

The mounting mechanism 1 of the first embodiment according to the present invention allows the second plate 12 and the extensible screw 13 of the retaining base 10 to face downward to couple to the article 20, and the second plate 12 may further supper the computer mainframe 40.

Figure 7:
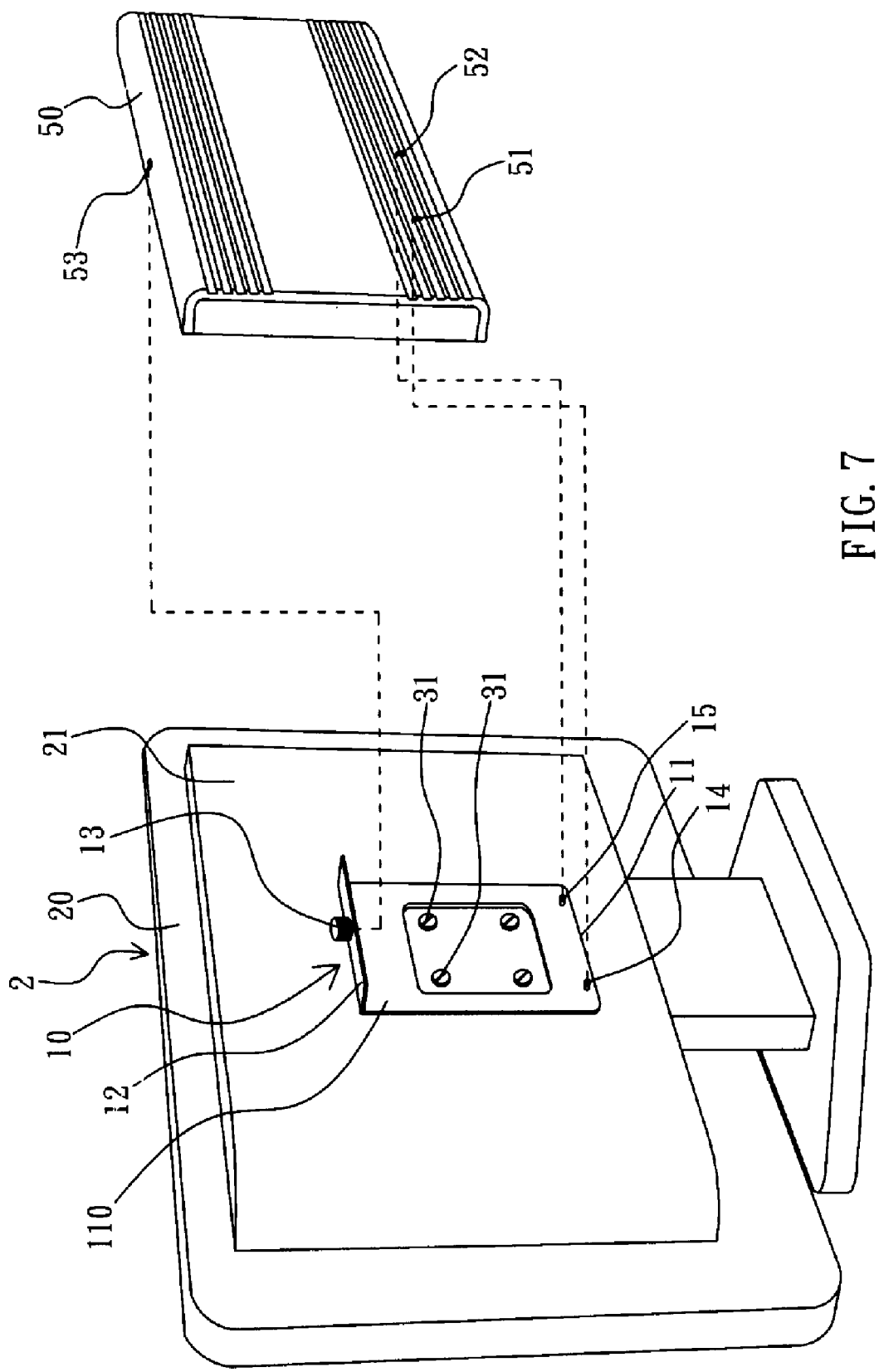
FIG. 7 is a schematic view, showing a mounting mechanism of a second preferred embodiment according to the present invention while being not coupled to a computer mainframe.
Figure 8:
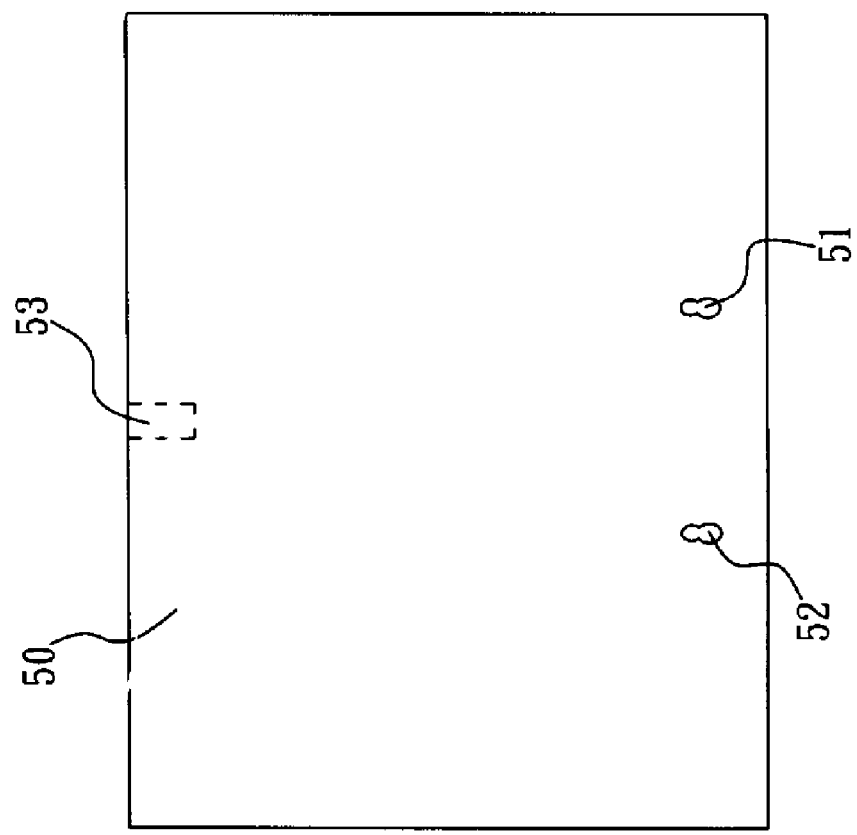
FIG. 8 is a rear view of another computer mainframe.
Figure 9:
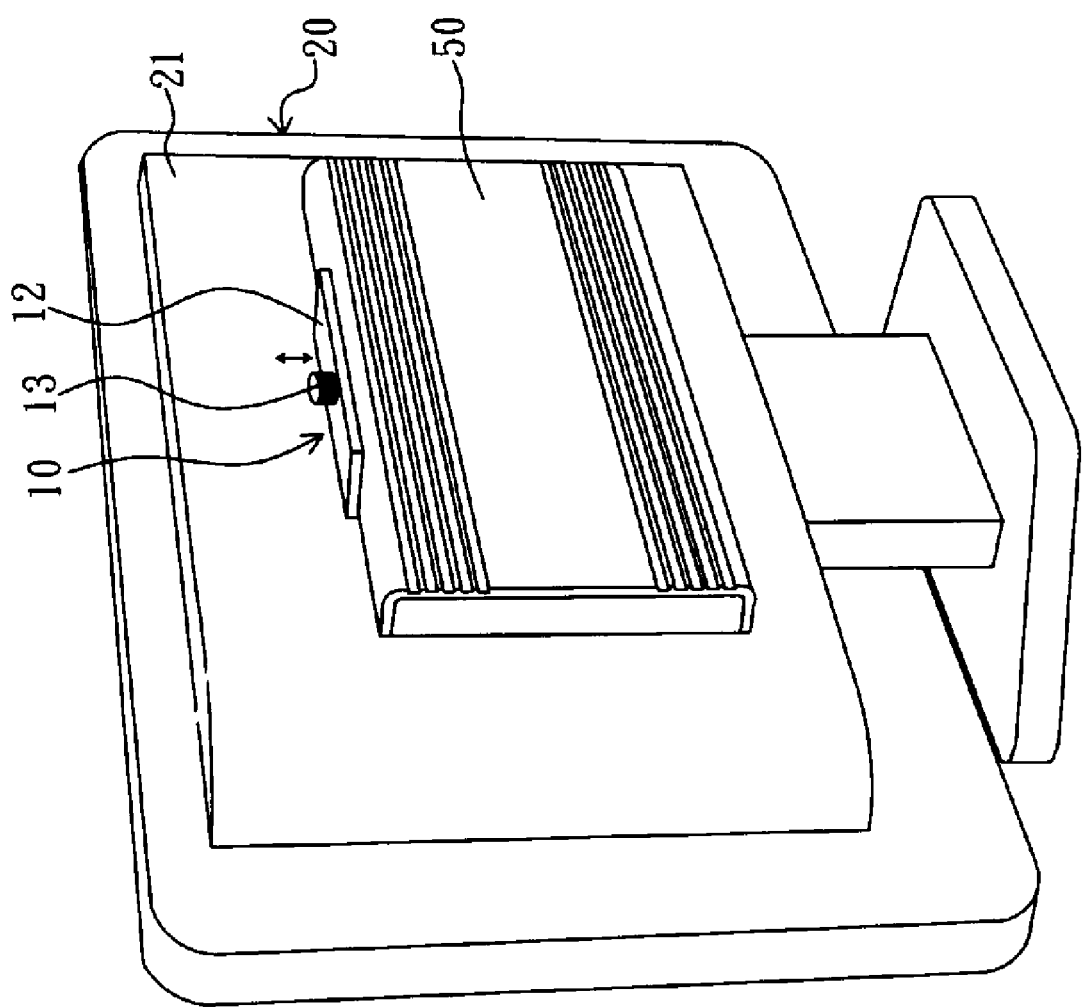
FIG. 9 is a perspective view, showing a mounting mechanism of the second embodiment according to the present invention coupled to another computer mainframe.

As shown in FIGS. 7, 8 and 9. A mounting mechanism 2 for fixing a computer mainframe of a second preferred embodiment according to the present invention also includes the retaining base 10 and the article 20 of the first embodiment. The retaining base 10 is also coupled to the article 20 through the plurality of screws 31. But, the second plate 12 and the extensible screw 13 of the retaining base 10 are faced upward to couple to the article 20. Similarly, the retaining base 10 may be used to couple to another computer mainframe 50 detachably, allowing another computer mainframe 50 to couple to the article 20 detachably. But, two hanging holes 51 and 52 of another computer mainframe 50 are positioned below a screw hole 53, and the screw hole 53 is positioned on the upper end of another computer mainframe 50.

The structure of the mounting mechanism for fixing a computer mainframe of the present invention is simple; a user may hang the computer the computer mainframe on the two hanging tabs of the retaining base from below to above, and then rotate the extensible screw to lock the retaining base to the computer mainframe, thereby coupling the other article such as a LCE to the computer mainframe stably and conveniently and detaching the computer mainframe easily without using tools.

Using the two hanging tabs of the retaining base can prevent the computer mainframe from swaying about in order to achieve a positioning effect and support the weight of the computer mainframe; the computer mainframe will not drop down even if the extensible screw at the below is loose. In addition, the first plate may also be disposed with only one hanging tab; the same effect can be achieved by matching the leaning of the second plate against the computer mainframe.

The design of only coupling the upper end or lower end of the first plate of the retaining base of the present invention to the second plate thereof (i.e. the second end of the first plate is the lower end of the first plate and the hanging tabs are positioned above the second plate, or the second end of the first plate is the upper end and the hanging tabs are positioned below the second plate) allows the mounting mechanism to couple a computer mainframe with a different outlook (especially a different width). The mounting mechanism can be coupled to the computer mainframe stably only if the two hanging tabs of the first plate respectively corresponds to the two hanging holes of the computer mainframe and the hole of the second plate corresponds to the screw hole of the computer mainframe.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mounting mechanism for fixing a computer mainframe, comprising:
  a retaining base, comprising:
    a first plate, having an abutment face, a first end and a second end, at least one hanging tab being disposed on a position close to said first end of said first plate, said hanging tab being projected out of said abutment mean;

a second plate, coupled to said second end of said first plate, said second plate being perpendicular to said first plate, said second plate being projected out of said abutment face, said second plate being disposed with a hole;

a screw, disposed with a bolt, said bolt being coupled to said second plate movably, said hole of said second plate accepting said bolt;

wherein said second end of said first plate is the lower end of said first plate and said at least one hanging tab is positioned above said second plate, or said second end of said first plate is the upper end of said first plate and said at least one hanging tab is positioned below said second plate;

wherein said at least one hanging tab is adapted to extend in at least one hanging hole of a computer mainframe corresponding thereto, said bolt is adapted to extend out of said hole of said second plate to be engaged with a screw hole of said computer mainframe corresponding thereto.

2. The mounting mechanism for fixing a computer mainframe according to claim 1, wherein said first plate is disposed with two hanging tabs.

3. The mounting mechanism for fixing a computer mainframe according to claim 2, wherein said screw is an extensible screw; said extensible screw comprises:

a movable portion, disposed with an inner space;

a fixed portion, being a tube-shaped object; an inner space of said movable portion being engaged with said fixed portion movably; a first interference element and a second interference element being respectively inside the upper end of said movable portion and outside the lower end of said fixed portion, said second interference element being adapted to limit the vertical movement of said first interference element along the outer periphery of said fixed portion, preventing said first interference element from moving further downward to separate from the fixed portion;

the bolt, the lower end of said bolt being coupled to said movable portion;

a coiled spring, engaged with said bolt; said coiled spring and said bolt being positioned inside an inner space of said fixed portion and an inner space of said movable portion; a third interference element is disposed inside the upper end of said fixed portion in order to prevent said coiled spring from projecting our of said fixed portion.

4. The mounting mechanism for fixing a computer mainframe according to claim 2, wherein said two hanging tab are arranged at the same horizontal plane.

5. The mounting mechanism for fixing a computer mainframe according to claim 4, wherein said screw is an extensible screw; said extensible screw comprises:

a movable portion, disposed with an inner space;

a fixed portion, being a tube-shaped object; an inner space of said movable portion being engaged with said fixed portion movably; a first interference element and a second interference element being respectively inside the upper end of said movable portion and outside the lower end of said fixed portion, said second interference element being adapted to limit the vertical movement of said first interference element along the outer periphery of said fixed portion, preventing said first interference element from moving further downward to separate from the fixed portion;

the bolt, the lower end of said bolt being coupled to said movable portion;

a coiled spring, engaged with said bolt; said coiled spring and said bolt being positioned inside an inner space of said fixed portion and an inner space of said movable portion; a third interference element is disposed inside the upper end of said fixed portion in order to prevent said coiled spring from projecting our of said fixed portion.

6. The mounting mechanism for fixing a computer mainframe according to claim 4, further comprising an article; said retaining base is coupled to said article fixedly.

7. The mounting mechanism for fixing a computer mainframe according to claim 6, wherein said screw is an extensible screw; said extensible screw comprises:

a movable portion, disposed with an inner space;

a fixed portion, being a tube-shaped object; an inner space of said movable portion being engaged with said fixed portion movably; a first interference element and a second interference element being respectively inside the upper end of said movable portion and outside the lower end of said fixed portion, said second interference element being adapted to limit the vertical movement of said first interference element along the outer periphery of said fixed portion, preventing said first interference element from moving further downward to separate from the fixed portion;

the bolt, the lower end of said bolt being coupled to said movable portion;

a coiled spring, engaged with said bolt; said coiled spring and said bolt being positioned inside an inner space of said fixed portion and an inner space of said movable portion; a third interference element is disposed inside the upper end of said fixed portion in order to prevent said coiled spring from projecting our of said fixed portion.

8. The mounting mechanism for fixing a computer mainframe according to claim 6, wherein said first plate has a plurality of holes; a rear face of said article is disposed with a plurality of screw holes; a plurality of screws are respectively passed through said plurality of holes to engage with said plurality of screw holes, allowing said first plate to be coupled to said rear face of said article fixedly.

9. The mounting mechanism for fixing a computer mainframe according to claim 8, wherein said screw is an extensible screw; said extensible screw comprises:

a movable portion, disposed with an inner space;

a fixed portion, being a tube-shaped object; an inner space of said movable portion being engaged with said fixed portion movably; a first interference element and a second interference element being respectively inside the upper end of said movable portion and outside the lower end of said fixed portion, said second interference element being adapted to limit the vertical movement of said first interference element along the outer periphery of said fixed portion, preventing said first interference element from moving further downward to separate from the fixed portion;

the bolt, the lower end of said bolt being coupled to said movable portion;

a coiled spring, engaged with said bolt; said coiled spring and said bolt being positioned inside an inner space of said fixed portion and an inner space of said movable portion; a third interference element is disposed inside the upper end of said fixed portion in order to prevent said coiled spring from projecting our of said fixed portion.

10. The mounting mechanism for fixing a computer mainframe according to claim 8, wherein said first plate has an indented face; said indented face is disposed with said plurality of holes; said indented face is indented toward said rear face of said abutment face; said plurality of screws are not projected out of said abutment face.

11. The mounting mechanism for fixing a computer mainframe according to claim 10, wherein said screw is an extensible screw; said extensible screw comprises:
   a movable portion, disposed with an inner space;
   a fixed portion, being a tube-shaped object; an inner space of said movable portion being engaged with said fixed portion movably; a first interference element and a second interference element being respectively inside the upper end of said movable portion and outside the lower end of said fixed portion, said second interference element being adapted to limit the vertical movement of said first interference element along the outer periphery of said fixed portion, preventing said first interference element from moving further downward to separate from the fixed portion;
   the bolt, the lower end of said bolt being coupled to said movable portion;
   a coiled spring, engaged with said bolt; said coiled spring and said bolt being positioned inside an inner space of said fixed portion and an inner space of said movable portion; a third interference element is disposed inside the upper end of said fixed portion in order to prevent said coiled spring from projecting our of said fixed portion.

12. The mounting mechanism for fixing a computer mainframe according to claim 10, wherein said article is a display.

13. The mounting mechanism for fixing a computer mainframe according to claim 12, wherein said screw is an extensible screw; said extensible screw comprises:
   a movable portion, disposed with an inner space;
   a fixed portion, being a tube-shaped object; an inner space of said movable portion being engaged with said fixed portion movably; a first interference element and a second interference element being respectively inside the upper end of said movable portion and outside the lower end of said fixed portion, said second interference element being adapted to limit the vertical movement of said first interference element along the outer periphery of said fixed portion, preventing said first interference element from moving further downward to separate from the fixed portion;
   the bolt, the lower end of said bolt being coupled to said movable portion;
   a coiled spring, engaged with said bolt; said coiled spring and said bolt being positioned inside an inner space of said fixed portion and an inner space of said movable portion; a third interference element is disposed inside the upper end of said fixed portion in order to prevent said coiled spring from projecting our of said fixed portion.

14. The mounting mechanism for fixing a computer mainframe according to claim 12, wherein said display is a liquid crystal display.

15. The mounting mechanism for fixing a computer mainframe according to claim 14, wherein said screw is an extensible screw; said extensible screw comprises:
   a movable portion, disposed with an inner space;
   a fixed portion, being a tube-shaped object; an inner space of said movable portion being engaged with said fixed portion movably; a first interference element and a second interference element being respectively inside the upper end of said movable portion and outside the lower end of said fixed portion, said second interference element being adapted to limit the vertical movement of said first interference element along the outer periphery of said fixed portion, preventing said first interference element from moving further downward to separate from the fixed portion;
   the bolt, the lower end of said bolt being coupled to said movable portion;
   a coiled spring, engaged with said bolt; said coiled spring and said bolt being positioned inside an inner space of said fixed portion and an inner space of said movable portion; a third interference element is disposed inside the upper end of said fixed portion in order to prevent said coiled spring from projecting our of said fixed portion.

16. The mounting mechanism for fixing a computer mainframe according to claim 14, wherein said hanging tab has a blocking portion.

17. The mounting mechanism for fixing a computer mainframe according to claim 16, wherein said screw is an extensible screw; said extensible screw comprises:
   a movable portion, disposed with an inner space;
   a fixed portion, being a tube-shaped object; an inner space of said movable portion being engaged with said fixed portion movably; a first interference element and a second interference element being respectively inside the upper end of said movable portion and outside the lower end of said fixed portion, said second interference element being adapted to limit the vertical movement of said first interference element along the outer periphery of said fixed portion, preventing said first interference element from moving further downward to separate from the fixed portion;
   the bolt, the lower end of said bolt being coupled to said movable portion;
   a coiled spring, engaged with said bolt; said coiled spring and said bolt being positioned inside an inner space of said fixed portion and an inner space of said movable portion; a third interference element is disposed inside the upper end of said fixed portion in order to prevent said coiled spring from projecting our of said fixed portion.

18. The mounting mechanism for fixing a computer mainframe according to claim 1, wherein said screw is an extensible screw; said extensible screw comprises:
   a movable portion, disposed with an inner space;
   a fixed portion, being a tube-shaped object; an inner space of said movable portion being engaged with said fixed portion movably; a first interference element and a second interference element being respectively inside the upper end of said movable portion and outside the lower end of said fixed portion, said second interference element being adapted to limit the vertical movement of said first interference element along the outer periphery of said fixed portion, preventing said first interference element from moving further downward to separate from the fixed portion;
   the bolt, the lower end of said bolt being coupled to said movable portion;
   a coiled spring, engaged with said bolt; said coiled spring and said bolt being positioned inside an inner space of said fixed portion and an inner space of said movable portion; a third interference element is disposed inside the upper end of said fixed portion in order to prevent said coiled spring from projecting our of said fixed portion.

* * * * *